United States Patent Office 2,922,786
Patented Jan. 26, 1960

2,922,786
THERAPEUTIC COMPOUNDS

Joseph Sam, De Witt, N.Y., assignor, by mesne assignments, to Bristol-Myers Company, New York, N.Y., a corporation of Delaware No Drawing. Application December 12, 1956
Serial No. 627,728

6 Claims. (Cl. 260—247.5)

This invention relates to certain bis-quaternary amines of therapeutic value in the treatment of hypertension and, more particularly, to a series of bis quaternary salts of 2-($\beta$-disubsituted-aminoethyl)-5-ethyl-1-substituted-piperidines.

This application is a continuation-in-part of my prior, copending application Ser. No. 586,377, filed May 22, 1956, now abandoned.

There is provided by the present invention a compound selected from the group consisting of compounds having the formula

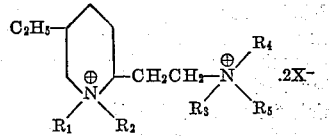

wherein $R_1$ represents (lower)alkyl; $R_2$ and $R_3$ are like members selected from the group consisting of (lower)alkyl and benzyl; $R_4$ and $R_5$ are members selected from the group consisting of (lower), alkyl and, when taken together with the nitrogen atom, piperidino, 2-methyl-5-ethylpiperidino, morpholino, pipecolino, pyrrolidino, 2,6-dimethylmorpholino, 1,2,3,4-tetrahydroisoquinolino and octahydroindolino; and X represents one equivalent of a non-toxic anion.

The preferred non-toxic anions include the halides (chloride, bromide and iodide), (lower)alkyl sulfate and p-toluenesulfonate. Each of these two anions is bound by ionic linkage with one of the positively charged nitrogen atoms. The anion $X^-$ is of little consequence in such active compounds since the physiological activity resides in the cation. As prepared, $X^-$ may be chloride, bromide, iodide, methanesulfonate, ethanesulfonate, toluenesulfonate or the like. By exchange reactions of the conventional sort one of the original variants of $X^-$ might be replaced by malate, succinate, fumarate, tartrate or oleate. The salts obtained through these variations of $X^-$ may in some cases have special advantages due to solubility, ease of crystallization, lack of objectionable taste, etc., but these are all subsidiary to the main physiological action which is independent of the character of $X^-$. Hence, all variants of $X^-$ are considered equivalents.

The products of the present invention are prepared by treating with at least two equivalents of an alkylating agent a free base having the formula

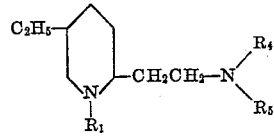

wherein $R_1$, $R_4$ and $R_5$ represent the same groups as in the formula above. Suitable alkylating agents include (lower)alkyl halides, aralkyl halides such as benzyl chloride, alkyl sulfates such as dimethyl sulfate and aryl sulfonates such as p-toluene-sulfonate. Use may be made, but is not essential, in this reaction of inert solvents, pressure vessels and increased temperatures to facilitate the reaction.

The free bases used as starting reagents are prepared in general by the reaction of 2-vinyl-5-ethylpyridine with a secondary amine, followed by reduction of the pyridine ring of the addition product to a piperidine and alkylation of the piperidine compound to an N-substituted piperidine compound. In this connection, see Reich and Levine, J. Am. Chem. Soc. 77, 4913, and U.S. Patent 2,684,965. Such intermediates and their methods of preparation are illustrated below under the title "Preparation of Intermediates."

PREPARATION OF INTERMEDIATES—I

A. 5-ethyl-2-($\beta$-morpholinoethyl)pyridine:

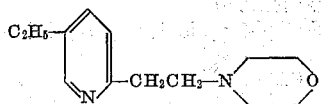

A mixture of 67 g. (0.5 mole) of commercially available 5-ethyl-2-vinylpyridine and 44 g. (0.5 mole) of morpholine was refluxed twenty hours and then distilled in vacuo. The fraction boiling at 115°–125°/0.5 mm. was redistilled to give 21.5 g. 5-ethyl-2-($\beta$-morpholinoethyl)pyridine, B.P. 123°/0.8 mm., $n_D^{24.8}$ 1.5197.

Analysis.—Calc'd for $C_{13}H_{20}N_2O$: C, 70.87; H, 9.15. Found: C, 70.5; H, 9.06.

The dimethiodide melted at 135°–138° C. after recrystallization from methanol.

Analysis.—Calc'd for $C_{15}H_{26}I_2N_2O$: C, 35.73; H, 5.20. Found: C, 35.6; H, 5.32.

B. 2-[$\beta$-(5-ethyl-2-pyridyl)ethyl]-1,2,3,4-tetrahydroisoquinoline:

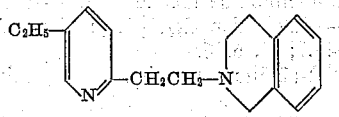

A mixture of 26.6 g. (0.2 mole) of 5-ethyl-2-vinylpyridine, 26.6 g. (0.2 mole) of 1,2,3,4-tetrahydroisoquinoline, 12 g. (0.2 mole) of glacial acetic acid and 100 ml. methanol was heated under reflux for six hours, the methanol removed by distillation and the residue poured on ice, made alkaline with 10% sodium hydroxide and extracted with ether. The ethereal extract was dried over anhydrous sodium sulfate, the ether was evaporated and the residue was distilled to give 10 g. 2-[$\beta$-(5-ethyl-2-pyridyl)ethyl]-1,2,3,4-tetrahydroisoquinoline, B.P. 182° C./0.8 mm., $n_D^{26}$ 1.5699.

Analysis.—Calc'd for $C_{18}H_{22}N_2$: C, 81.17; H, 8.33. Found: C, 81.0; H, 8,18.

C. 1-[2-(5-ethyl-2-pyridyl)ethyl]-indole:

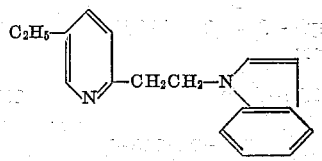

A mixture of 75 g. (0.55 mole) of 5-ethyl-2-vinylpyridine, 35.1 g. (0.3 mole) of indole and 1 g. (0.04 mole) of sodium was slowly heated with shaking. The reaction began just above the melting point of the sodium and heating was temporarily discontinued. Then the mixture was held at 140°–160° C. for three hours. After the addition of 6 ml. ethanol to the cooled mixture, it was poured into water and extracted with ether. The ethereal extract was dried over potassium carbonate and distilled to give 1-[2-(5-ethyl-2-pyridyl)ethyl]indole, B.P. 170° C./0.5 mm., $n_D^{24.5}$ 1.5917.

*Analysis.*—Calc'd for $C_{17}H_{18}N_2$: C, 81.56; H, 7.25. Found: C, 81.4; H, 7.35.

The methiodide melted at 190°–192° C. after recrystallization from absolute ethanol.

*Analysis.*—Calc'd for $C_{18}H_{21}IN_2$: C, 55.11; H, 5.40. Found: C, 55.2; H, 5.74.

The following compounds are prepared according to the above general procedures:

D. α - {([2 - (5 - ethyl - 2 - pyridyl)ethyl]methylamino)methyl}-benzylalcohol:

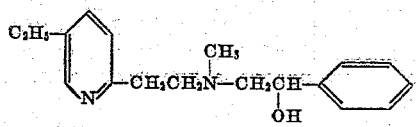

B.P. 178° C./0.4 mm.; $n_D^{26°}$ 1.5489.

*Analysis.*—Calc'd for $C_{18}H_{24}N_2O$: C, 76.02; H, 8.51. Found: 76.25; H, 8.70.

E. 1-[2-(5-ethyl-2-pyridyl)ethyl]pyrrole:

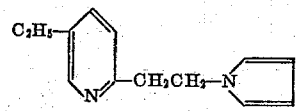

F. 5-ethyl-2-(2-pyrrolidinoethyl)pyridine:

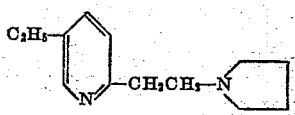

B.P. 108° C./0.8 mm.; $n_D^{24°}$ 1.5181.

*Analysis.*—Calc'd for $C_{13}H_{20}N_2$: C, 76.42; H, 9.87. Found: C, 76.7; H, 9.97.

The di-methiodide melted at 154°–155° C.

*Analysis.*—Calc'd for $C_{15}H_{26}I_2N_2$: C, 36.90; H, 5.37. Found: C, 37.0; H, 5.41.

The mono-methiodide melted at 130°–130.5° C.

*Analysis.*—Calc'd for $C_{14}H_{23}IN_2$: C, 48.56; H, 6.70. Found: C, 48.7; H, 6.86.

G. 5-ethyl-2-(2-dimethylaminoethyl)pyridine:

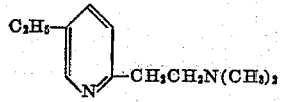

B.P. 132° C./18 mm.; $n_D^{23°}$ 1.5000.

H. 5-ethyl-2-(2-piperidinoethyl)pyridine:

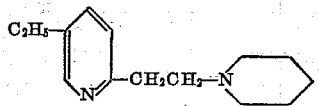

I. 5-ethyl-2-(2-α-pipecolinoethyl)pyridine:

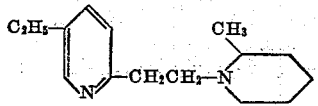

J. 5 - ethyl - 2 - (2 - [2',6' - dimethylmorpholino]ethyl)pyridine:

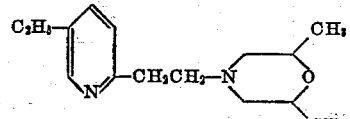

K. 5 - ethyl - 2 - (2 - [2' - methyl - 5' - ethylpiperidino]ethyl)pyridine:

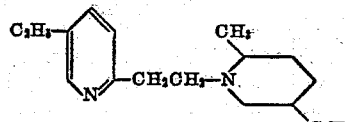

B.P. 183°–186° C./10 mm.; $n_D^{25}$ 1.5083.

*Analysis.*—Calc'd for $C_{17}H_{28}N_2$: C, 78.4; H, 10.8. Found: C, 78.5; H, 10.9.

L. 5-ethyl-2-(2-ethylaminoethyl)pyridine:

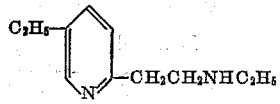

B.P. 101.5°–103° C./2 mm.; $n_D^{26.5}$ 1.5032.

*Analysis.*—Calc'd for $C_{11}H_{18}N_2$: C, 74.0; H, 10.2. Found: C, 74.2; H, 10.2

PREPARATION OF INTERMEDIATES—II

A. 5-ethyl-2-(2-morpholinoethyl)piperidine:

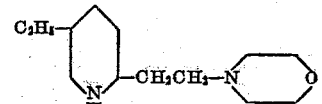

A solution of 22 g. (0.1 mole) of 5-ethyl-2-(β-morpholinoethyl)pyridine in 150 ml. glacial acetic acid was hydrogenated in the presence of 0.3 g. of $PtO_2$ at 54 lbs./in.² at room temperature for about twenty hours, absorbing 27 pounds of hydrogen. The catalyst was removed by filtration and the solvent by distillation in vacuo. The residue was neutralized with 10% sodium hydroxide and extracted with ether. The ethereal extract was dried over anhydrous potassium carbonate and the ether was removed by distillation to leave 5-ethyl-2-(2-morpholinoethyl)piperidine as an oil.

The 3,4,5-trimethoxybenzoyl derivative was obtained as an oil which failed to crystallize.

Repetition of this preparation gave the product which was distilled at 116°/0.8 mm., $n_D^{25}$ 1.4842.

*Analysis.*—Calc'd for $C_{13}H_{26}N_2O$: C, 68.98; H, 11.58. Found: C, 68.7; H, 11.68.

The acetamido derivatives was obtained as an oil which had B.P. 166° C./0.7 mm., $n_D^{25.5°}$ 1.4967.

*Analysis.*—Calc'd: C, 67.12; H, 10.52. Found: C, 67.1; H, 10.3.

The 2,4-dichlorobenzoyl derivative boiled at 234°–236° C./0.7 mm.

*Analysis.*—Calc'd for $C_{20}H_{28}Cl_2N_2O_2$: C, 60.15; H, 7.07. Found: C, 59.9; H, 6.82.

The methiodide of the 2,4-dichlorobenzoyl derivative melted at 235°–236° C.

*Analysis.*—Calc'd. for $C_{21}H_{31}Cl_2N_2O_2$: C, 46.59; H, 5.77. Found: C, 46.8; H, 5.91.

The following compounds are prepared according to the general procedure given above.

B. α - {([2 - 5 - ethyl - 2 - piperidyl]ethyl]methylamino)methyl}benzyl alcohol:

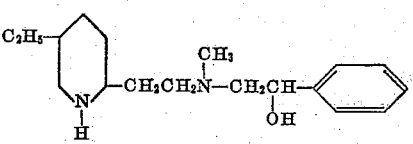

B.P. 178° C./0.6 mm.; $n_D^{24.50}$ 1.5218.

*Analysis.*—Calc'd for $C_{18}H_{30}N_2O$: C, 74.43; H, 10.41. Found: C, 74.2; H, 10.4.

C. 5- ethyl - 2 - [2 - (octahydro - 1 - indolyl)ethyl] piperidine:

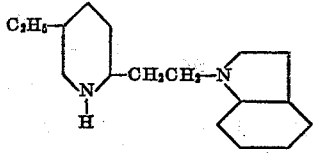

B.P. 146° C./0.8 mm.; $n_D^{25°}$ 1.4964.

*Analysis.*—Calc'd for $C_{17}H_{32}N_2$: C, 77.2; H, 12.20. Found: C, 77.2; H, 12.4.

E. 5 - ethyl-1-methyl-2-(2-piperidinoethyl)piperidine:

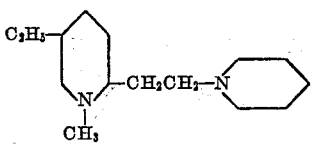

F. 5 - ethyl - 1-methyl-2-(β-1,2,3,4-tetrahydroisoquinolinoethyl)-piperidine:

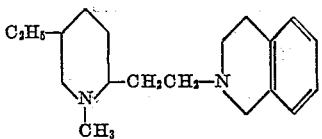

B.P. 191.5°–195° C./2 mm.; $n_D^{26.5}$ 1.5316.
Analysis.—Calc'd for $C_{19}H_{30}N_2$: C, 79.6; H, 10.6. Found: C, 79.8; H, 10.8.

G. 5 - ethyl - 1 - methyl-2-[2-(octahydro-1-indolyl)-ethyl]piperidine:

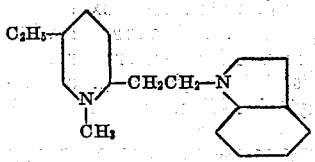

H. 5 - ethyl - 1-methyl-2-(2-α-pipecolinoethyl)piperidine:

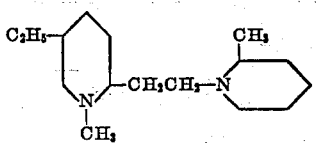

I. 1,5 - diethyl - 2 - (2-[2',6'-dimethylmorpholino]-ethyl)-piperidine:

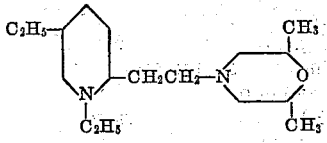

J. 5 - ethyl - 1-beta-phenethyl-2-(2'-morpholinoethyl)-piperidine.

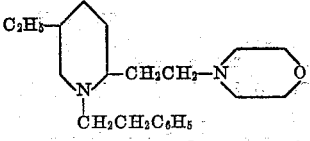

A mixture of 34 g. (0.15 mole) of 5-ethyl-2-(2'-morpholinoethyl)piperidine, 21 g. (0.15 mole) of anhydrous potassium carbonate and 37 g. (0.20 mole) of β-phenethyl bromide in 120 ml. toluene was refluxed for 17 hours. After adding water, the toluene was separated and extracted several times with dilute hydrochloric acid. The separated and combined aqueous extracts were washed with ether and then neutralized with sodium hydroxide. The product separated as an oil and was extracted into ether. The ethereal extracts were combined, washed with water and saturated aqueous sodium chloride, dried over anhydrous potassium carbonate and distilled to give 23.3 g. product, B.P. 193°–197° C./1.5 mm.; $n_D^{22°}$ 1.5220.
Analysis.—Calc'd for $C_{21}H_{34}N_2O$: C, 76.4; H, 10.4. Found: C, 76.6; H, 10.3.

K. 5 - ethyl - 1-methyl-2-(2-ethylmethylaminoethyl)-piperidine:

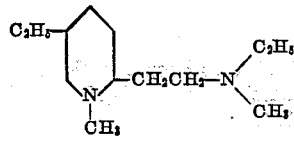

5-ethyl-2-(2-ethylaminoethyl)-piperidine (55.3 g., 0.3 mole) was dissolved in 61 ml. (1.4 moles) of 88% formic acid with cooling. Formalin (40%; 60 ml., 0.73 mole) was added and the mixture was heated 16 hours on the steam bath. After cooling, 125 ml. concentrated hydrochloric acid was added and the solution was concentrated on the steam bath, cooled, neutralized with 25% aqueous sodium hydroxide and extracted with ether. The aqueous phase was saturated with potassium carbonate and re-extracted with ether. The combined ethereal extracts were dried over anhydrous potassium carbonate and distilled to give the base, B.P. 138° C./18 mm. to 143° C./19.5 mm.; $n_D^{26.5}$ 1.4635.
Analysis.—Calc'd for $C_{13}H_{28}N_2$: C, 73.4; H, 13.3. Found: C, 73.1; H, 13.1.

L. 5 - ethyl - 1-methyl-2-(2-[2'-methyl-5'-ethyl-piperidino]-ethyl)piperidine:

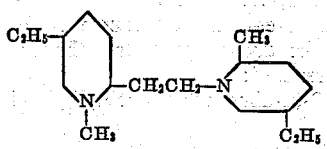

The following examples are given to illustrate the scope of this invention without limiting it thereto.

Example 1

1,1 - dimethyl - 5 - ethyl - 2 - (2 - morpholinoethyl)-piperidinium iodide methoiodide:

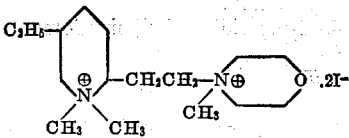

A. A solution of 9 g. (0.041 mole) 5-ethyl-1-methyl-2-(2 - morpholinoethyl)piperidine and 20 g. (0.14 mole) methyl iodide in 50 ml. acetonitrile was allowed to stand at room temperature for three days. 1,1 - dimethyl - 5-ethyl-2-(2-morpholinoethyl)-piperidinium iodide methiodide precipitated, was collected by filtration, dried, found to weigh 19 g., recrystallized successively from aqueous methanol, aqueous acetone and water and found to melt at 275°–277° C. with decomposition.
Analysis.—Calc'd for $C_{16}H_{34}I_2N_2O$: C, 36.65; H, 6.54. Found: C, 36.4 36.6; H, 6.40, 6.40.

B. A solution of 10 g. (0.04 mole) of 5-ethyl-2-(2-morpholinoethyl)piperidine and 28.5 g. (0.2 mole) of methyl iodide in 50 ml. methanol was heated under reflux for three hours, cooled and the precipitated 1,1-dimethyl - 5 - ethyl - 2 - (2 - morpholinoethyl) - piperidinium iodide methiodide was collected by filtration, M.P. 273°–275° C.

Example 2

1,1 - dimethyl - 5 - ethyl - 2 - (2 - pyrrolidinoethyl)-piperidinium iodide methiodide:

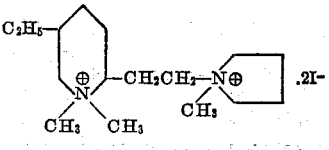

To a solution of 21 g. (0.1 mole) of 5-ethyl-1-methyl-2-(2-pyrrolidinoethyl)piperidine in 100 ml. of acetonitrile there was added with cooling 20 ml. of methyl iodide. The mixture was heated on the steam bath for one hour and cooled and the precipitated 1,1-dimethyl-5-ethyl-2-(2-pyrrolidinoethyl)-piperidinum iodide methiodide was collected by filtration, recrystallized from methanol and found to melt at 255°–256° C. with decomposition.
Analysis.—Calc'd for $C_{16}H_{34}I_2N_2$: C, 37.81; H, 6.74. Found: C, 37.7; H, 6.62.

D. 5-ethyl-2-(2-pyrrolinoethyl)piperidine:

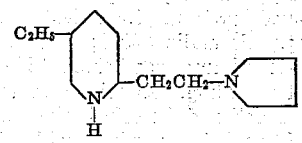

B.P. 99°–103° C./0.8–1.1 mm.; $n_D^{24.5°}$ 1.4844.

Analysis.—Calc'd for $C_{13}H_{26}N_2$: C, 74.22; H, 12.46. Found: C, 74.3; H, 12.1.

The 2,4-dichlorobenzoyl derivative boiled at 218°–220° C./1.0 mm.

Analysis.—Calc'd for $C_{20}H_{28}Cl_2N_2O$: C, 62.67; H, 7.36. Found: C, 62.3; H, 7.46.

The methiodide of the 2,4-dichlorobenzoyl derivative melted at 205°–207° C.

Analysis.—Calc'd for $C_{21}H_{31}Cl_2IN_2O$: C, 48.01; H, 5.95. Found: C, 47.8; H, 5.78.

By the use of equivalent amounts of the appropriate re-agents in the above procedure, the following compounds are prepared:

E. 5-ethyl-2-(2-dimethylaminoethyl)piperidine:

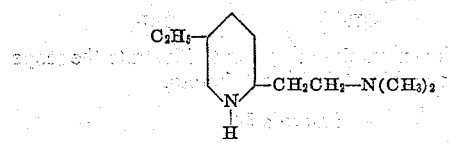

B.P. 80°–84° C./2.5 mm.; $n_D^{27.5°}$ 1.4675.

Analysis.—Calc'd for $C_{11}H_{24}N_2$: C, 71.6; H, 13.1. Found: C, 71.6; H, 12.8.

F. 5-ethyl-2-(2-piperidinoethyl)piperidine:

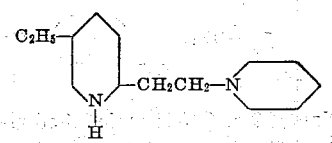

G. 5 - ethyl-2-(β-1,2,3,4-tetrahydroisoquinolinoethyl)-piperidine:

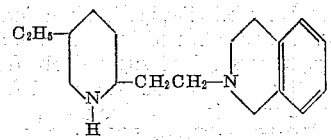

B.P. 180°–183° C./2 mm.; $n_D^{27.5°}$ 1.5340.

Analysis.—Calc'd for $C_{18}H_{27}N_2$: C, 79.7; H, 10.0. Found: C, 79.5; H, 10.3.

H. 5-ethyl-2-(2-α-pipecolinoethyl)piperidine:

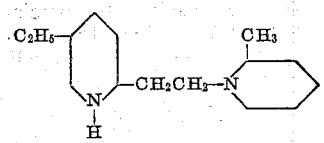

I. 1 - ethyl - 2-(2-[2',6'-dimethylmorpholino]ethyl)-piperidine:

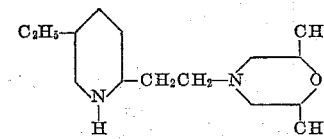

J. 5-ethyl-2-(2-ethylaminoethyl)-piperidine:

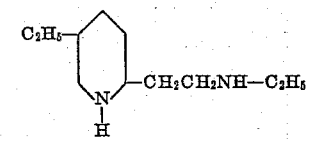

B.P. 86°–90° C./2 mm.; $n_D^{28°}$ 1.4709.

Analysis.—Calc'd for $C_{11}H_{24}N_2$: C, 71.6; H, 13.1. Found: C, 72.2; H, 12.6.

K. 5 - ethyl-2-(2-[2'-methyl-5'-ethyl-piperidino]ethyl)-piperidine:

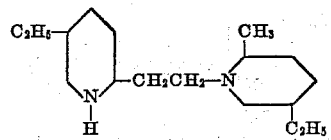

PREPARATION OF INTERMEDIATES—III

A. 1,5-diethyl-2-(2-morpholinoethyl)piperidine:

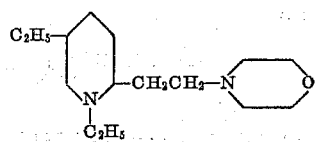

A mixture of 22.6 g. (0.1 mole) of 5-ethyl-2-(2-morpholinoethyl)piperidine, 23.4 g. (0.15 mole) of ethyl iodide and 13.8 g. (0.1 mole) of potassium carbonate was heated on a steam bath for 20 hours. After the addition of 50 ml. water, the mixture was heated for another hour, cooled, and extracted with ether. The ethereal extract was dried over anhydrous potassium carbonate and distilled to give 6 g. of 1,5-diethyl-2-(2-morpholinoethyl)piperidine, B.P. 134°/1.5 mm., $n_D^{26°}$ 1.4827.

Analysis.—Calc'd for $C_{15}H_{30}N_2O$: C, 70.81; H, 11.89. Found: C, 70.9; H, 11.91.

B. 5 - ethyl-1-methyl-2-(2-morpholinoethyl)piperidine:

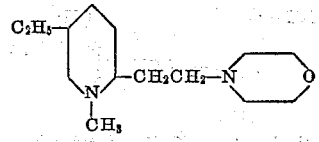

To cooled 5 - ethyl - 2-(2-morpholinoethyl)piperidine (24.9 g.; 0.11 mole) there was gradually added 11.2 g. (0.24 mole) of 98% formic acid. To this mixture there was added 3.6 g. (10 ml.; 0.12 mole) of 37% formaldehyde. After heating on the steam bath for four hours (with copious evolution of $CO_2$) the solution was cooled, treated with 30 ml. of concentrated hydrochloric acid and evaporated in vacuo on the steam bath. The residue was warmed with excess 40% NaOH, cooled and extracted with ether. The ethereal extract was dried over anhydrous potassium carbonate and distilled to give 5-ethyl - 1 - methyl-2-(2-morpholinoethyl)-piperidine, B.P. 118° C./0.7 mm., $n_D^{25.3°}$ 1.4835.

Analysis.—Calc'd for $C_{14}H_{28}N_2O$: C, 69.95; H, 11.74. Found: C, 70.1; H, 11.5.

C. 5 - ethyl-1-methyl-2-(2-pyrrolidinoethyl)piperidine:

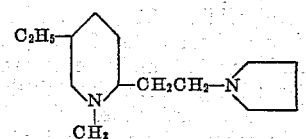

This compound was prepared by the method of B, above. B.P. 130° C./3.0 mm.; $n_D^{25}$ 1.4825.

By the use of equivalent amounts of the appropriate re-agents in one of the above procedures, the following compounds are prepared:

D. 5 - ethyl-1-methyl-2-(2-dimethylaminoethyl)piperidine:

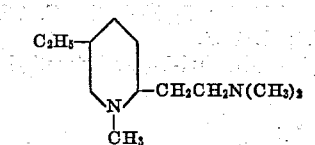

B.P. 121°–127° C./17 mm.; $n_D^{26.5°}$ 1.4626.

Analysis.—Calc'd for $C_{12}H_{26}N_2$: C, 72.6; H, 13.2. Found: C, 72.8; H, 13.1.

Example 3

By the use of equivalent amounts of the appropriate reagents in one of the procedures of Example 1, the following compounds are prepared:

A. 1 - benzyl - 1 - methyl - 5 - ethyl - 2 - (2 - morpholinoethyl)piperidinium chloride benzochloride:

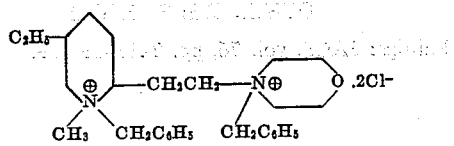

B. 1,1,5 - triethyl - 2 - (2 - morpholinoethyl) - piperidinium bromide ethobromide:

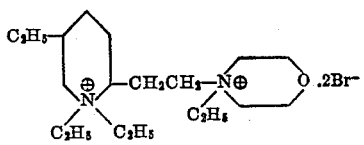

C. 1,1 - dimethyl - 5 - ethyl - 2 - (2 - dimethylaminoethyl)-piperidinium iodide methiodide:

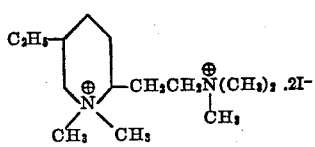

M.P 254°–255° C. (dec.) after recrystallization from methanol.
Analysis.—Calc'd for $C_{14}H_{32}I_2N_2$: C, 34.8; H, 6.70. Found (after correction for water): C, 34.3; H, 6.70.

D. 1,1 - dimethyl - 5 - ethyl - 2 - (2 - piperidinoethyl)-piperidinium iodide methiodide:

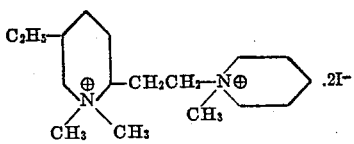

E. 1,1 - dimethyl - 5 - ethyl - 2 - (β - 1,2,3,4 - tetrahydroisoquinolinoethyl)-piperidinium iodide methiodide:

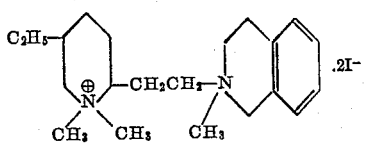

F. 1,1 - dimethyl - 5 - ethyl - 2 - [2 - (octahydro - 1-indolyl)ethyl]piperidinium iodide methiodide:

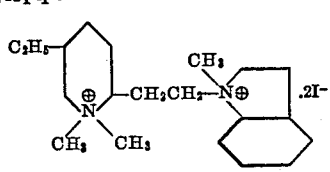

G. 1,1 - dimethyl - 5 - ethyl - 2 - (2 - α - pipecolinoethyl)-piperidinium iodide methiodide:

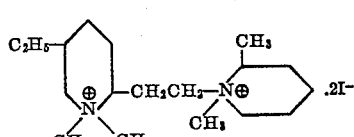

H. 1,1,5 - triethyl - 2 - (2 - [2',6' - dimethylmorpholino]ethyl)piperidinium iodide ethiodide:

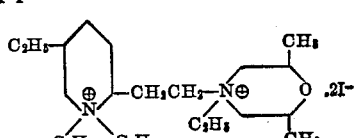

I. 1,1 - dimethyl - 5 - ethyl - 2 - (2 - ethylmethyl - aminoethyl)-piperidinium iodide methiodide:

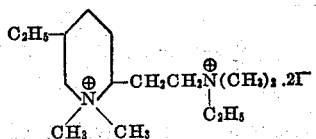

M.P. 236°–238° C. (dec.) after recrystallization from methanol-ether.
Analysis.—Calc'd for $C_{15}H_{34}I_2N_2$: C, 36.2; H, 6.90. Found (after correction for water): C, 36.4; H, 6.90.

J. 1 - ethyl - 1 - methyl - 5 - ethyl - 2 - (2 - morpholinoethyl)piperidinium iodide ethiodide:

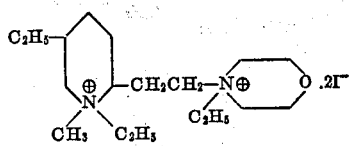

M.P. 254°–255° C. (dec.).

K. 1,1 - dimethyl - 5 - ethyl - 2 - (2 - [2' - methyl - 5'-ethylpiperidino]ethyl)piperidinium iodide methiodide:

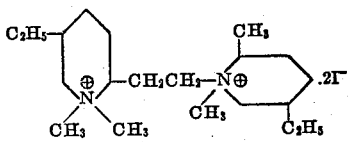

I claim:
1. A compound selected from the group consisting of compounds having the formula

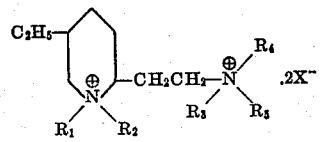

wherein $R_1$ represents (lower)alkyl; $R_2$ and $R_3$ are like members selected from the group consisting of (lower) alkyl and benzyl; $R_4$ and $R_5$ are members selected from the group consisting of (lower) alkyl and, when taken together with the nitrogen atom, piperidino, 2-methyl-5-ethylpiperidino, morpholino, pipecolino, pyrrolidino, 2,6-dimethylmorpholino, 1,2,3,4-tetrahydroisoquinolino and octahydroindolino; and X represents one equivalent of a non-toxic anion.

2. A compound having the formula

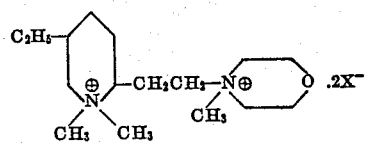

where $X^-$ represents one equivalent of a non-toxic anion.

3. A compound having the formula

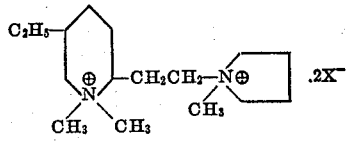

wherein $X^-$ represents one equivalent of a non-toxic anion.

4. A compound having the formula

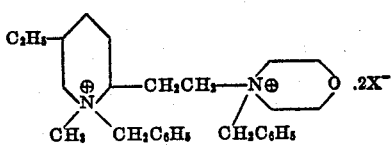

wherein $X^-$ represents one equivalent of a non-toxic anion.

5. A compound having the formula
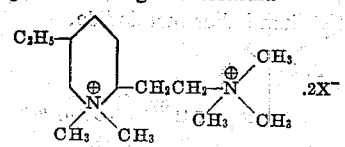
wherein X⁻ represents one equivalent of a non-toxic anion.
6. A compound having the formula
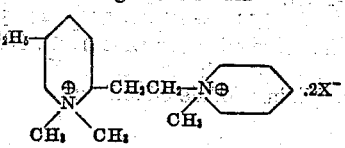
wherein X⁻ represents one equivalent of a non-toxic anion.
References Cited in the file of this patent
UNITED STATES PATENTS
2,684,965    Weston _____ July 27, 1954
OTHER REFERENCES
Phillips: JACS, vol. 76, pp. 2211–13 (1954).